United States Patent [19]

Cordiano

[11] Patent Number: 4,524,631
[45] Date of Patent: Jun. 25, 1985

[54] VALVE FOR POWER-STEERING SYSTEMS

[75] Inventor: Ettore Cordiano, Turin, Italy

[73] Assignee: Corint S.r.L., Turin, Italy

[21] Appl. No.: 438,423

[22] Filed: Nov. 2, 1982

[30] Foreign Application Priority Data

Nov. 9, 1981 [IT] Italy ................... 68449 A/81

[51] Int. Cl.³ ................ F16H 35/00; F16K 31/44; B62D 5/06; F15B 9/10
[52] U.S. Cl. .................. 74/388 PS; 74/422; 251/229; 251/237; 180/148; 137/DIG. 4; 91/368
[58] Field of Search ............. 74/388 PS, 498, 422; 180/148, 132; 251/229, 236, 237; 137/DIG. 4, 625.68, 625.69; 91/368

[56] References Cited

U.S. PATENT DOCUMENTS

| 3,997,425 | 8/1976 | Hayashida | 137/DIG. 4 X |
| 4,182,427 | 1/1980 | Ewald | 180/148 |
| 4,245,815 | 1/1981 | Willis | 137/DIG. 4 X |
| 4,279,323 | 7/1981 | Ando et al. | 180/148 |
| 4,369,694 | 1/1983 | Perineau | 91/368 |
| 4,449,601 | 5/1984 | Adams | 180/148 |

FOREIGN PATENT DOCUMENTS

| 303738 | 12/1932 | Italy | 251/229 |
| 449518 | 9/1934 | United Kingdom | 251/229 |
| 808373 | 2/1959 | United Kingdom | |
| 1100059 | 1/1968 | United Kingdom | |
| 1345668 | 1/1974 | United Kingdom | |

Primary Examiner—Allan D. Herrmann
Assistant Examiner—Stephen B. Andrews
Attorney, Agent, or Firm—Sughrue, Mion, Zinn Macpeak & Seas

[57] ABSTRACT

Valve for controlling a power-assisted rack-and-pinion steering mechanism, of the slide-valve kind, whose slide member 11 moves along an axis different from that of the pinion 1 as a result of the axial movement of the pinion produced by the thrust exerted on it by the rack because of the inclination of its teeth, said slide member being connected to the pinion through a kinematic mechanism with a high transmission ratio consisting of a rubber ring, all outer surfaces of which are enclosed by rigid walls, a push-rod 10, and resilient means pressing one against the other said rubber ring, push-rod and slide member in such a way that the displacements of the slide member is given by the displacement of the pinion multiplied by the ratio between the area of the rubber exposed to the axial thrust acting on the pinion and the area of the cross-section of push-rod 10.

3 Claims, 3 Drawing Figures

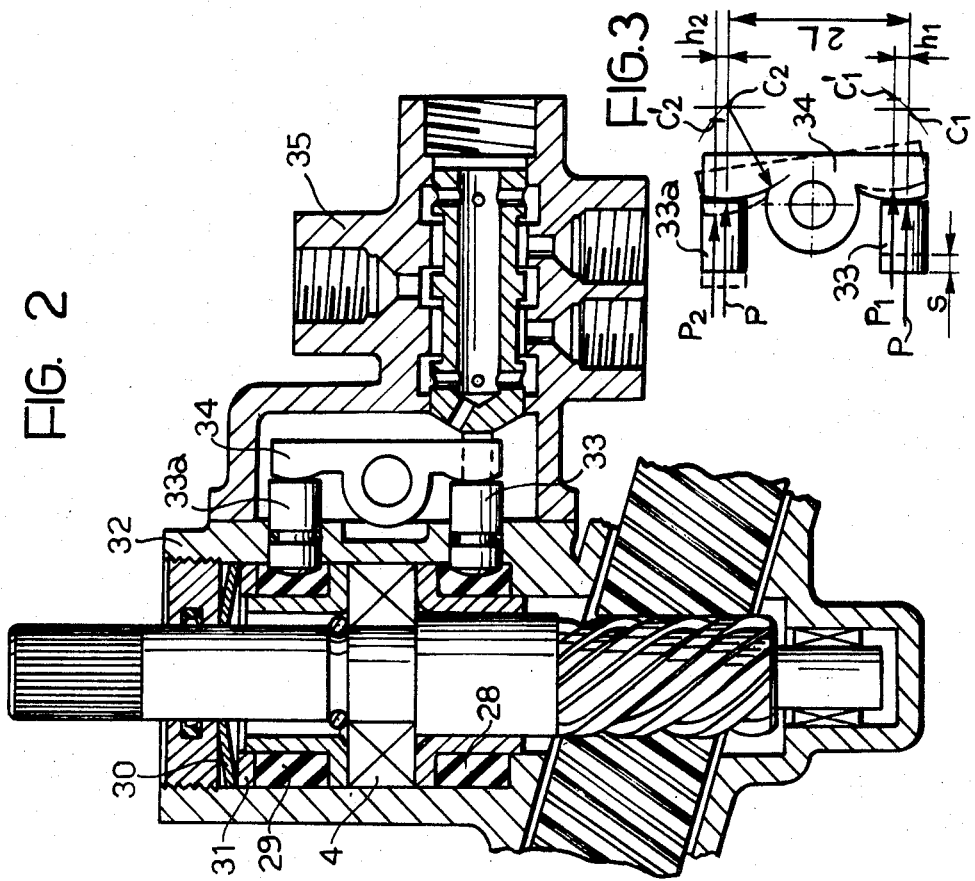
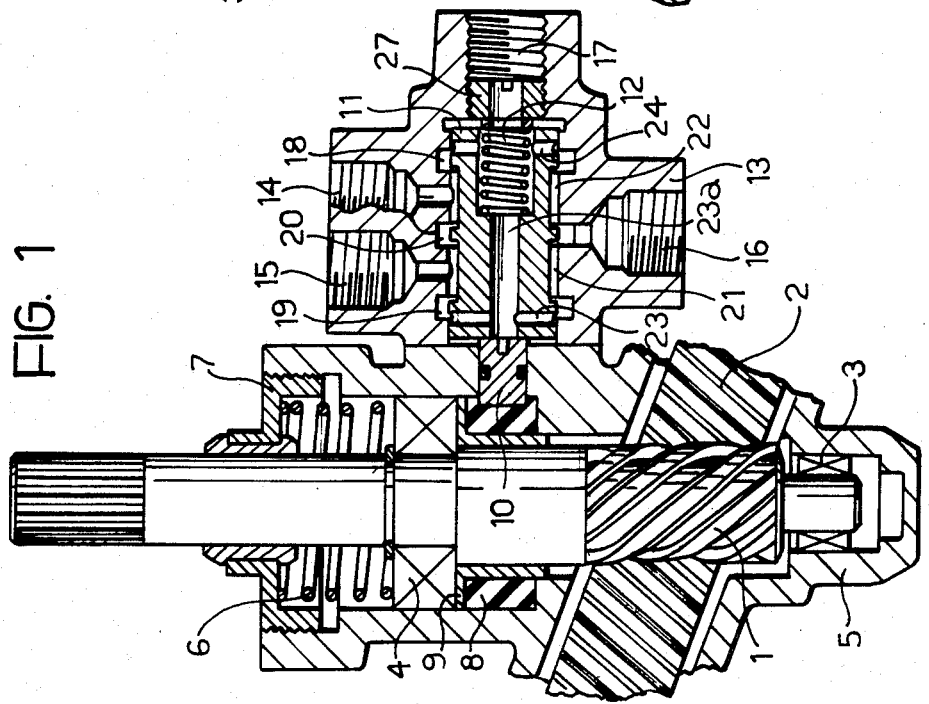

VALVE FOR POWER-STEERING SYSTEMS

The present invention relates to a valve for controlling a power-assisted rack-and-pinion steering mechanism with pinion having helical teeth, of the kind comprising:

A slide member moving in translation along an axis different from that of the pinion and A kinematic mechanism which transforms the axial movement of the pinion, resulting from the axial thrusts acting on it, into translation movement of the slide member.

Valve operation is based on the principle of detecting the torque by sensing the axial thrusts which the pinion receives from the rack as a result of the inclination of its teeth and of using the small movements of the pinion permitted by the pinion securing means, which are suitably resilient, for atuating a slide valve, the actuation being via suitable members with a high transmission ratio.

Power-assisted steering units of this kind are already known, where the axial movements of the pinion are used for controlling valve movements, directly or through intermediate means. As examples the following Patents can be cited: British Pat. No. 808.373—Vehicle power-steering, where a displacement multiplication device is provided, which is a lever whose extremities are engaging the pinion and the valve moving member, in such a way that the valve displacements are larger than the pinion axial displacements British Pat. No. 1.100.059—Power-assisted steering, where the means axially securing the pinion is held in its centre position by a resilient means and has, on its outer surface, grooves that, cooperating with recesses in the housing, control the fluid flow from the pump to the actuator and reservoir. British Pat. No. 1,345,668—Power-steering system, where a slide valve, axially rigidly connected to the pinion, controls the fluid flow according to the piston displacements and gives on the same pinion a reaction proportional to fluid pressure.

The first of these solutions has the problem of the clearances between the various components of the multiplication device which can dangerously influence the operation of the the steering system, and it requires therefore specially tight tolerances for all components.

The second and third mentioned solutions require too big displacements of the pinion for controlling the pressure variations in the actuator chambers, and these displacements inconvenience the driver because of the vibrations transmitted to the steering-wheel and the noise inevitably generated.

The third device, moreover, British Pat. No. 1.345.668, so as it is described and illustrated does not operate because it works only in one direction.

It is the object of the present invention to realize a valve with a slide member whose displacements are much larger that the pinion axial displacements through a kinematic mechanism without clearance between its components.

This object is reached according to the invention in that said mechanism consist of: rubber members, all surface of which are enclosed by rigid walls, and axially securing the axial bearing of the pinion; sensor means pressed against said rubber members by suitable means, in such a way that every movement of the bearing results in a rigidly defined movement of each sensor given by the movement of the pinion multiplied by the ratio between the area of the rubber exposed to the axial thrust exerted on it by the pinion and the area of the sensor means in contact with the rubber and projected along its axis of motion, at least one of said sensors or a member cooperating with the sensors being connected to the slide member of the valve.

The advantage of the invention consists in particular in the fact that it permits to obtain with simple and economic means a high transmission ratio without any clearance in the kinematic chain and, consequently, to have very small pinion displacements and thus a better directional feeling because of the small elastic rotations of the steering-wheel necessary for attaining the full power-assistance.

Further advantages of the invention are an easier calibration of pressure variation rate, due to the large displacements of valve slide member, and a more adaptable bulk because the valve can be located in the most favourable position with respect to the other adjacent car components, by making the valve rotate around the pinion axis.

The invention will now be described, by way of non limitative example, with reference to the accompanying drawings, in which:

FIG. 1 shows a kinematic mechanism with one rubber ring,

FIG. 2 shows a valve with two rubber rings, and

FIG. 3 is a detail of the rocker and push-rods system of FIG. 2.

The valves indicated in both FIGS. 1 and 2 are of the kind suitable for open centre power-steering systems, i.e. with oil continually circulating in the hydraulic circuit; but, obviously, the invention applies to whatever kind of slide valves and power-steering system.

With reference to FIG. 1, pinion 1, meshing with rack 2, is journalled on housing 5, from below by bush or equivalent means 3, and above by bearing 4 which secures it in axial direction. Spring 6, stressed by plug 7, presses bearing 4 against a rubber ring 8. An intermediate casing 9 is placed between ring 8 and bearing 4 and is shaped so that the outer surface of the ring is completely enclosed by the casing itself and by the housing. Spring 12 presses slide 11 against push-rod 10 which, consequently, is urged against rubber ring 8.

Under these conditions the rubber, since it is compressed between rigid walls, behaves like an incompressible liquid and transmits pressure uniformly at all points. Consequently, any movement of the bearing results in a rigidly defined movement of the push-rod, given by the former multiplied by the ratio between the annular section of rubber compressed by casing 9 and the cross-section of push-rod 10. With the dimensions of the drawing of FIG. 1 the aforementioned ratio is about 10/1, i.e. a movement of a tenth of a millimeter by the pinion corresponds to movement of one millimeter by the slide. It is important to note that this high transmission ratio is obtained without clearances that could create problems.

Housing 13 of the slide valve carries: (a) the terminals of the oil ducts, i.e. ducts 14, 15 leading to the two chambers of the actuator which assists the rack in its displacements, duct 16 supplying pressurized oil, duct 17 leading to the reservoir; (b) stationary grooves 18, 19, 20. Of these grooves: 18, 19 are permanently connected to the reservoir via holes 23, 23$_a$, 24 in the slide and via duct 17; groove 20 is connected to the pump.

Slide 11 bears moving grooves 21, 22. Sleeve 27 is screwed into housing 13 and abuts spring 12. Through sleeve 27, spring 12 is adjusted so as to balance the thrust exerted by rubber ring 8 on push-rod 10 in the centre position.

The valve operates as follows. When the torque applied to the pinion is zero, slide 11 is in its centre position; the oil arriving at groove 20 flows freely to the reservoir through the passages between the edges of the moving and stationary grooves, and via holes 23, 23a, 24 and duct 17. Under these conditions the pressure in both chambers is equal and paractically zero.

If torque is applied, e.g. clock-wise, to pinion 1, because of the axial thrust on its teeth, the pinion moves, e.g. downwards, and push-rod 10 and slide 11 move to the right. This throttles the connection between grooves 22 and 20 and between 19 and 21, whereas the flow gaps between grooves 18 and 22 are opened more widely. Under these conditions, for the actuator chamber connected to duct 15 the connection to the reservoir is throttled and the inlet of oil from the pump is opened wider, so that the pressure therein increases; for the other chamber the inflow of oil is cut off and the outlet is opened wider so that its pressure drops at the minimum level. The opposite happens in the two chambers if the torque direction is reversed.

If suitable values are given to the helix angle of the pinion teeth, to the spring rate of spring 12, to the flow passages of the grooves edges, and if these passages are suitably shaped by flaring, when necessary, the same edges, the variation of pressure with torque can be given the required shape.

Function of spring 6 is essentially to pre-stress rubber ring 8 so that it is never completely free from stress, even when pinion 1 is subjected to the maximum thrust upwards. Its other function is to compensate thermal expansion of the rubber, which could bring the valve out of adjustment by modifying the centre position of slide 11 with zero torque, and could cause very high pressures in the rubber and abnormal stresses in the entire valve. For this reason spring 6 must be as flexible as possible, and it is sufficient to design spring 12 so that its spring rate is greater than or at least equal to that of spring 6, to obtain that variation in the height of the ring through thermal expansion are almost completely absorbed by spring 6, without significantly moving slide 11.

FIG. 2 shows an other kind of kinematic mechanism connecting the slide valve to the pinion, similar to FIG. 1 but in which the problem of thermal expansion is completely eliminated. In FIG. 2 pinion bearing 4 is compressed between two rubber rings 28, 29 which are pre-stressed by spring 30 via ring 31. The two rubber rings, the entire surfaces of which are surrounded as shown in FIG. 1, are pressed by two push-rods 33, $33_a$ guided in box 32 and at the opposite end pressing against the ends of a rocker 34 secured to a pivot borne by the slide valve housing 35. A push-rod (33 in FIG. 2) is connected to the moving slide of the valve, which operates in the previously described manner.

Under these conditions, any variation in length of the rings through thermal expansion or any other cause results simply in a variation in the pressure on spring 30; at zero torque the pressure in both rings is always equal.

In this method, the same rocker exerts a return force on the slide towards the centre position, without help from any other resilient component. This will be more clearly understood from the following considerations referring to FIG. 3. It is assumed that push-rod 33 has been moved towards the exterior by a distance s such that the two centres of the circular tracks of the rocker, in contact with the push-rods, are respectively brought from $C_1$ to $C_1'$ and from $C_2$ to $C_2'$, whereas the points of contact between tracks and push-rods move upwards by $h_1$ and $h_2$ respectively. Under these conditions, even if forces P remain equal, they will subject the rocker to a return torque $M=P.(h_1-h_2)$. In reality the return torque is slightly lower since, under the assumed conditions, $P_2$ is less than P and $P_1$ is greater than P.

The torque depends on the load P and on the geometry of the rocker. It can easily be shown that, in the case of small movements, the torque is given by the relation $M=P.s.2.R/L$, where R is the radius of the rocker track and 2L the distance between centres $C_1$ and $C_2$. This relation shows how the return action can be most conveniently varied if the values of P and L are fixed.

In other respects the slide operates in identical manner to FIG. 1.

Obviously, whatever kind of valve is used, the kinematic mechanism of FIG. 2 ca be modified by connecting the slide member not directly to the push-rod but to any other point of the rocker, thus enabling the system to increase furthermore the displacement of the slide member with respect to the push-rod.

Moreover, instead of making the push-rod integral with the slide member, as shown in FIG. 2, a system similar to that of FIG. 1 can be adopted, with the push-rod separated from the slide member and a spring pressing the latter against the rocker.

Of course, the invention, which has been described by way of non-limitative example, can be varied and modified for increasing the efficiency and reducing the cost of the device in question, without thereby departing from the scope of the present invention.

I claim:

1. A valve for controlling a power assisted rack and pinion steering system comprising housing means, helical pinion means having a longitudinal axis mounted for limited axial movement along said axis in said housing means, prestressed rubber means operatively coupled to said helical pinion means for compression and expansion in the axial direction upon axial movement of said helical pinion means, control valve means having a slide member disposed therein for controlling the flow of fluid to said power assisted steering means and sensor means operatively coupled to said slide member and disposed in engagement with said rubber means for movement along an axis substantially perpendicular to the axis of said helical pinion means whereby every axial movement of said helical pinion means will result in a specific movement of said sensor means given by the movement of the pinion multiplied by the ratio between the area of the rubber means exposed to the axial thrust exerted by said helical pinion means and the area of said sensor means in contact with said rubber means and projected along its axis of motion.

2. A valve for controlling a power assisted rack and pinion steering system as set forth in claim 1 wherein said helical bearing means is provided with a shaft extending through said housing and annular bearing means secured about said shaft for sliding movement within said housing, wherein said rubber means is comprised of an annular rubber ring supported by said housing and a moveable annular casing enclosing said rubber ring in conjunction with said housing and interposed between said rubber ring and said shaft and bearing means and wherein said sensor means is comprised of a push rod slidably mounted in said housing perpendicular to said shaft in contact with said rubber ring and said slide member of said control valve and further comprising first spring means disposed in said housing for prestressing said rubber ring through said bearing means and said casing and second spring means biasing said push rod against said rubber ring to prestress said rubber ring in the radial direction.

3. A valve for controlling a power assisted rack and pinion steering mechanism according to claim 1 wherein said helical pinion means includes a shaft extending through said housing and annular bearing means secured thereto for sliding engagement within said housing, wherein said rubber means is comprised of first and second annular rubber rings disposed in said housing and extending about said shaft on opposite sides of said bearing means, first and second annular casing means enclosing said first and second rubber rings in conjunction with said housing and interposed between said rubber rings and said bearing means and said shaft and wherein said sensor means is comprised of first and second push rods slidably mounted in said housing perpendicular to said shaft in contact with said first and second rings respectively and pivoted rocker arm means engaging said first and second push rods at opposite ends thereof for prestressing said first and second rubber rings in the radial direction with said first push rod being operatively connected to said slide member and further comprising spring means in said housing for applying an axially directed force to said first and second rubber rings for prestressing said rubber rings in the axial direction.

\* \* \* \* \*